(12) United States Patent
Kim

(10) Patent No.: US 10,689,024 B2
(45) Date of Patent: Jun. 23, 2020

(54) METHOD FOR DETERMINING ASSIST TORQUE OF POWER STEERING SYSTEM

(71) Applicants: Hyundai Motor Company, Seoul (KR); Kia Motors Corporation, Seoul (KR)

(72) Inventor: Chan Jung Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 266 days.

(21) Appl. No.: 15/822,122

(22) Filed: Nov. 25, 2017

(65) Prior Publication Data

US 2019/0077447 A1 Mar. 14, 2019

(30) Foreign Application Priority Data

Sep. 8, 2017 (KR) .......................... 10-2017-0114845

(51) Int. Cl.
*B62D 5/04* (2006.01)
*B62D 5/06* (2006.01)
*B62D 6/00* (2006.01)

(52) U.S. Cl.
CPC ............. *B62D 5/0463* (2013.01); *B62D 5/06* (2013.01); *B62D 6/00* (2013.01); *B62D 6/008* (2013.01)

(58) Field of Classification Search
CPC combination set(s) only.
See application file for complete search history.

(56) References Cited

U.S. PATENT DOCUMENTS

| 2001/0041957 A1* | 11/2001 | McCann | B62D 5/0463 701/41 |
| 2003/0120404 A1* | 6/2003 | Endo | B62D 5/0463 701/41 |
| 2019/0002014 A1* | 1/2019 | Shah | B62D 5/0457 |

FOREIGN PATENT DOCUMENTS

| JP | 2007-261344 | 10/2007 |
| JP | 2013-063750 | 4/2013 |
| JP | 2013-159244 | 8/2013 |
| JP | 2017-001625 | 1/2017 |
| KR | 10-2014-0031023 | 3/2014 |

(Continued)

*Primary Examiner* — Rami Khatib
(74) *Attorney, Agent, or Firm* — MIntz Levin Cohn Ferris Glovsky and Popeo, P.C.; Peter F. Corless

(57) ABSTRACT

A method for determining an assist torque of a power steering system in a vehicle: setting an initial slope indicating a correlation between a driver steering torque and a vehicle lateral acceleration, wherein the initial slope is a tangential slope at a lowest point of the vehicle lateral acceleration defined in a diagram; setting a maximum driver steering torque, which is a maximum value of a steering torque that a driver applies through a steering wheel of the vehicle; calculating an assist torque based on the driver steering torque in response to performance of a steering assist, from the set initial slope and maximum driver steering torque, and vehicle eigen value information based on a predetermined equation; generating a torque map in which an assist torque value is set based on the driver assist torque upon the performance of the steering assist using assist torque values obtained for each driver steering torque detected by a torque sensor; and determining, by an electronic control unit (ECU), the assist torque value corresponding to the driver steering torque using the generated torque map.

6 Claims, 4 Drawing Sheets

(56) References Cited

FOREIGN PATENT DOCUMENTS

KR  10-2016-0044650    4/2016
KR  10-1734720         5/2017

* cited by examiner

【FIG. 1】
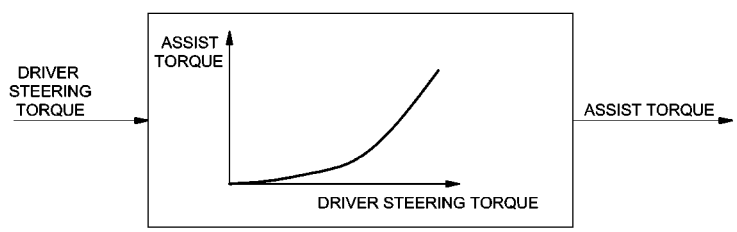
【FIG. 2】
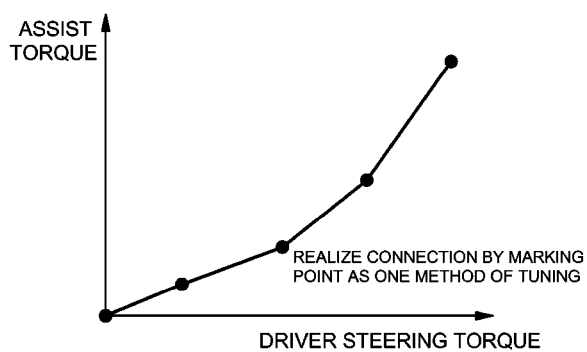

[FIG. 3]
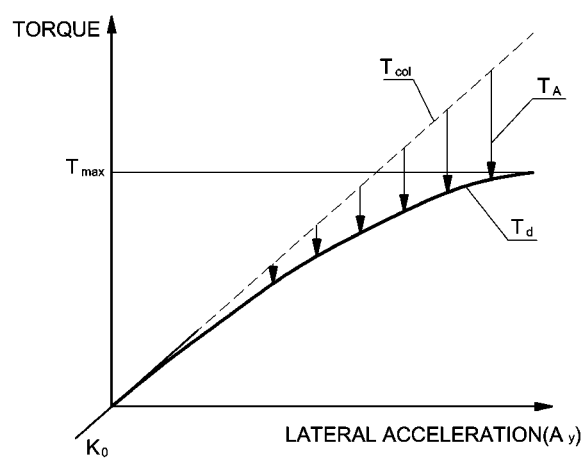

[FIG. 4]
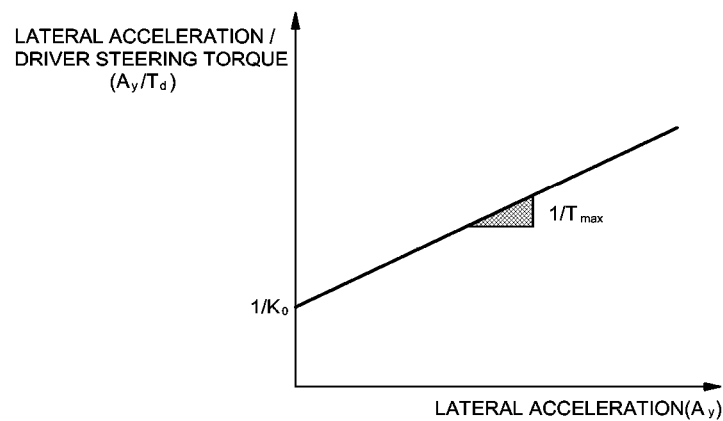

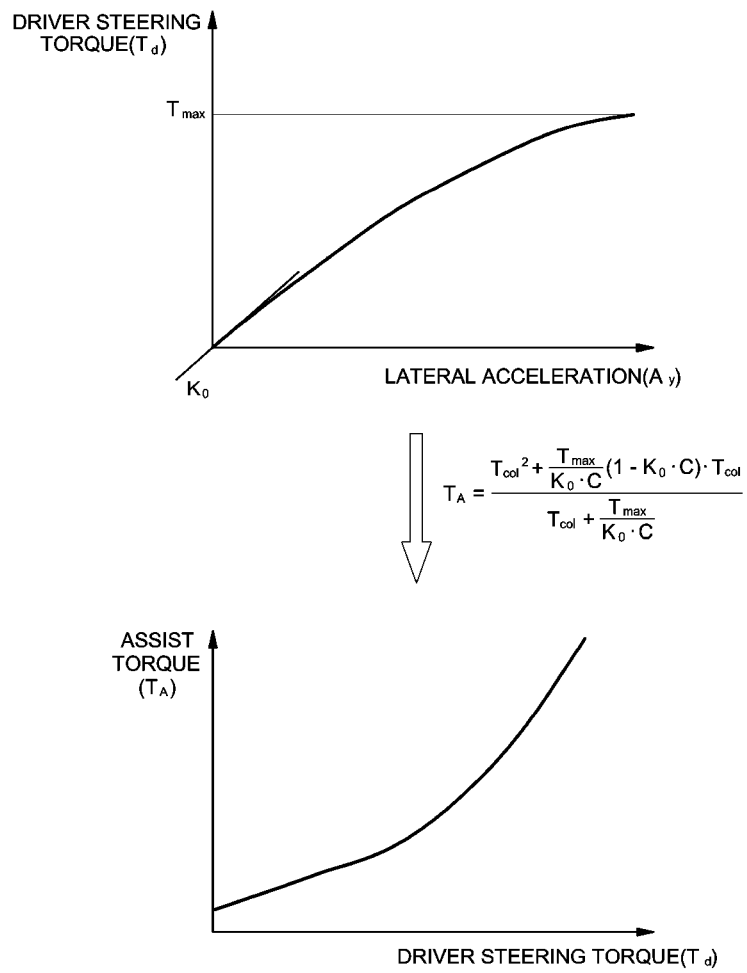
[FIG. 5]

METHOD FOR DETERMINING ASSIST TORQUE OF POWER STEERING SYSTEM

CROSS-REFERENCE TO RELATED APPLICATION

This application claims under 35 U.S.C. § 119(a) the benefit of priority to Korean Patent Application No. 10-2017-0114845 filed on Sep. 8, 2017, the entire contents of which are incorporated by reference as if fully set forth herein.

BACKGROUND

(a) Technical Field

The present disclosure relates to a method of determining an assist torque of a power steering system, and more particularly, to a method of determining an assist torque of a power steering system capable of improving the relationship between a steering operation of a driver and a vehicle response thereto.

(b) Background Art

Examples of a power steering system for reducing a driver steering torque when steering an automobile may include a hydraulic power steering (HPS) system that assists a driver steering torque using hydraulic pressure formed by a hydraulic pump and a motor-driven power steering (MDPS) system that assists a driver steering torque using output torque of an electric motor. The MDPS system, in particular, provides better steering performance and steering sense than the hydraulic steering system because the output torque (i.e., assist torque to be controlled) of the electric motor (steering motor) for steering assistance may be controlled according to running conditions of a vehicle when performing the steering assist function according to the steering wheel operation of the driver. Accordingly, the MDPS system is capable of changing and controlling the steering assist torque generated by the motor output according to the running conditions, and has been widely applied to recently manufactured vehicles.

The MDPS system may be configured to include a plurality of sensors, such as a steering angle sensor for detecting a steering angle (i.e., column input angle) and a torque sensor for detecting steering torques (i.e., steering wheel torque and column torque), an electronic control unit (ECU), a steering motor (MDPS motor), and so forth. In such configuration, the ECU receives and acquires driver steering input information, such as the steering angle, a steering angular velocity, and the steering torque, from the sensors in order to control the driving and output of the steering motor. (The steering angle may represent a rotational position of the steering wheel, the steering angular velocity may be a rotational angular velocity value of the steering wheel that is obtained from a separate sensor or from a differential signal of a steering angle signal (steering angle sensor signal), and the steering torque may be a torque that the driver applies to the steering wheel, that is, a driver input torque for steering.)

If the steering torque (i.e., driver input torque or driver steering torque) is detected by the torque sensor, the ECU controls the driving of the steering motor according to the detected driver steering torque and generates a torque (hereinafter, referred to as "assist torque") for the steering assist. In a conventional MDPS system, the ECU controls a motor current applied to the steering motor to be able to control the output of the steering motor that assists the driver steering torque. The ECU determines an assist torque value, which is a target value of the motor output, based on the information collected in the vehicle such as the driver steering torque detected by the torque sensor, and calculates the amount of current corresponding to the determined assist torque value as being tuned and applies the calculated amount of current to the steering motor. At this time, the assist torque which is the torque for assisting the driver steering torque is generated by the driving of the motor.

In the steering system, examples of the components for transmitting the driver steering torque applied through the steering wheel and the steering assist torque generated by the motor may include, for instance, a steering column installed at a lower part of the steering wheel, a gear box converting a torque transmitted from the steering column into a straight torque to change a direction of a tire, a universal joint for transmitting the torque transmitted to the steering column to the gear box, or the like. The gear box may include a rack bar that is provided with a pinion gear to receive a torque from a universal joint and a rack with which a pinion gear is engaged. When the pinion gear rotates, the rack bar linearly moves right and left by the rack. At this time, a force acting by the right and left linear movement of the rack bar is transmitted to the tire through a tie rod and a ball joint to change a direction of the tire.

On the other hand, according to conventional MDPS logic, a torque map as illustrated in FIG. 1 may be used to determine the assist torque value that may be a motor control value for the steering assist. The torque map is a map generated using previously accumulated torque values. It can be used to set the assist torque value as a value depending on the driver steering torque. That is, the torque map is provided so that the assist torque may be determined based on the driver steering torque detected in real-time by the torque sensor as an input, and may be produced using the information obtained during a preceding test and evaluation process.

FIG. 1 is an exemplified diagram for explaining a torque map, in which the assist torque value as a map value is briefly illustrated as a diagram.

As shown in FIG. 1, it can be seen that the assist torque values, which are map values, are set depending on the driver steering torque. In this way, after the torque map is produced by appropriately tuning the assist torque value based on the driver steering torque and is input to and stored in the ECU, when the ECU performs the MDPS logic, the torque map may be used to determine the assist torque value corresponding to the driver steering torque. For example, the assist torque value may be tuned depending on the driver steering torque, as illustrated in the diagram of FIG. 2, an interpolation method of marking points of each assist torque value (tuned value) depending on the driver steering torque values having a predetermined interval, and then connecting the points to each other to determine the remaining values.

However, according to this method, erroneous tuning is often performed since the degree of freedom of determination of the assist torque value that may be determined depending on the driver steering torque is high. Moreover, the actual torque tuning process is very difficult. In particular, it is difficult to determine and tune the optimum assist torque value in light of the relationship between the driver steering torque and the vehicle response under the targeted performance condition.

Therefore, there may be a delay between the steering torque that the driver actually inputs through the steering wheel and the vehicle response to the input of the steering torque. That is, the steering state and the lateral acceleration of the vehicle is insufficient. As a result, a feedback sense that indicates the sense of coincidence between the steering operation of the driver and the vehicle response may be insufficient.

The above information disclosed in this Background section is only for enhancement of understanding of the background of the disclosure, and therefore it may contain information that does not form the related art.

SUMMARY OF THE DISCLOSURE

The present disclosure has been made in an effort to solve the above-described problems associated with related art.

An object of the present disclosure is to provide a method for determining an assist torque of a power steering system capable of enhancing a sense of coincidence, or instantaneous operation, between a steering operation of a driver and a vehicle response, as well as a feedback sense upon a steering operation.

According to embodiments of the present disclosure, a method for determining an assist torque of a power steering system includes: setting an initial slope indicating a correlation between a driver steering torque and a vehicle lateral acceleration, wherein the initial slope is a tangential slope at a lowest point of the vehicle lateral acceleration defined in a diagram; setting a maximum driver steering torque, which is a maximum value of a steering torque that a driver applies through a steering wheel of the vehicle; calculating an assist torque based on the driver steering torque in response to performance of a steering assist, from the set initial slope and maximum driver steering torque, and vehicle eigen value information based on a predetermined equation; generating a torque map in which an assist torque value is set based on the driver assist torque upon the performance of the steering assist using assist torque values obtained for each driver steering torque detected by a torque sensor; and determining, by an electronic control unit (ECU), the assist torque value corresponding to the driver steering torque using the generated torque map.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein:

FIG. 1 is a diagram for explaining a torque map for determining an assist torque from a driver steering torque in a conventional power steering system;

FIG. 2 is a diagram illustrating a conventional method for tuning an assist torque value of a torque map;

FIG. 3 is a diagram illustrating a correlation between a driver steering torque and a vehicle lateral acceleration in the present disclosure;

FIG. 4 is a diagram illustrating the correlation between the vehicle lateral acceleration, the driver steering torque, and a maximum driver steering torque in the present disclosure; and FIG. 5 is a diagram illustrating a method for tuning an assist torque value based on an equation in the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION OF THE EMBODIMENTS

Hereinafter reference will now be made in detail to various embodiments of the present disclosure, examples of which are illustrated in the accompanying drawings and described below. While the disclosure will be described in conjunction with certain embodiments, it will be understood that present description is not intended to limit the disclosure to those embodiments. On the contrary, the disclosure is intended to cover not only the discloses embodiments, but also various alternatives, modifications, equivalents and other embodiments, which may be included within the spirit and scope of the disclosure as defined by the appended claims.

Hereinafter, embodiments of the present disclosure so as to be easily practiced by a person skilled in the art to which the present disclosure pertains will be described in detail with reference to the accompanying drawings. However, the present disclosure is not limited to exemplary embodiments herein, but may be implemented in other forms.

Throughout the present specification, unless explicitly described to the contrary, "comprising" any components will be understood to imply the inclusion of other elements rather than the exclusion of any other elements. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

The present disclosure provides a method for determining an assist torque of a power steering system capable of improving a coincidence between a steering operation of a driver and a vehicle response, such that the steering operation and the vehicle response are nearly contemporaneous, as well as a feedback sense upon the steering operation.

According to embodiments of the present disclosure, the power steering system may be an electric power steering system, that is, an MDPS system that assists a driver steering torque by using a torque (i.e., controlled assist torque) output from an electric motor. As described above, in the typical MDPS logic, the assist torque value may be referred to as a motor control value for steering assist. To determine the assist torque value, a torque map in which the assist torque is previously set as a value depending on the driver steering torque may be used.

The torque map is provided to determine an assist torque based on a driver steering torque detected in real-time by a torque sensor as an input. When the electronic control unit (ECU) performs an MDPS logic in a state in which the torque map is previously input and stored in the ECU, the torque map may be used to determine an assist torque value corresponding to the driver steering torque.

The method of determining an assist torque of a power steering system according to the present disclosure may include a process of generating the torque map, more specifically, a process of setting an assist torque value as a value depending on the driver steering torque in the production of the torque map.

Further, upon setting the assist torque value, a process of determining and tuning an assist torque value corresponding to a driver steering torque value using an initial slope $K_0$, a maximum driver steering torque $T_{max}$, known vehicle eigen value information, etc., is performed. Thus, the tuned value becomes a map value in the torque map, that is, an assist torque value corresponding to the driver steering torque in the torque map.

The above-mentioned torque map is setting data within the ECU in which the assist torque values corresponding to each driver steering torque are set in advance. As such, as the setting data in the ECU which may determine the assist torque value from the driver steering torque may be an equation that may calculate the assist torque using the initial slope $K_0$, the maximum driver steering torque $T_{max}$, the known vehicle eigen value information, etc., using the driver steering torque as a variable, instead of the torque map.

Here, the above equation may be a single or a plurality of relational expressions (i.e., correlative expressions) that define the correlation between the driver steering torque and the assist torque.

Hereinafter, embodiments of the present disclosure will be described in more detail.

First, equations capable of calculating the assist torque $T_A$ from the driver steering torque $T_d$ are derived using the relationship between the vehicle reaction state and the driver steering torque $T_d$ at a good feedback sense. The vehicle response may be a vehicle lateral acceleration $A_y$ according to the operation of the driver steering wheel.

Good feedback refers to driver steering torque, which is the steering input information according to a steering wheel operation of a driver, that coincides with the lateral acceleration which is the motion of the vehicle. This means that a driver steering torque $T_{col}$ continues to linearly increase in proportion to the lateral acceleration $A_y$ as the vehicle lateral acceleration $A_y$ continues to increase as indicated by the dotted line in FIG. 3.

However, if the relationship between the vehicle lateral acceleration $A_y$ and the driver steering torque $T_{col}$ is linearly proportional as described above, the driver steering torque $T_{col}$ required to obtain a high vehicle lateral acceleration $A_y$ is too large, such that it is very difficult for a driver to drive a vehicle. Therefore, as illustrated by the solid line in FIG. 3, in the correlation between the driver steering torque and the vehicle lateral acceleration, the increase in the driver steering torque $T_d$ is gradually reduced as the lateral acceleration $A_y$ increases.

If the assist torque $T_A$ is generated by the amount of torque that is insufficient compared with the linearly proportional driver steering torque (driver steering torque $T_{col}$ indicated by the dotted line), as the lateral acceleration $A_y$ increases, it is necessary to gradually increase the assist torque $T_A$ and set the initial slope $K_0$ and the maximum driver steering torque $T_{max}$.

This is as illustrated in FIG. 4, and may be represented by the following Equation (1).

$$\frac{1}{T_{max}} \cdot A_y + \frac{1}{K_0} = \frac{A_y}{T_d} \qquad \text{Equation (1)}$$

In Equation (1), $T_{max}$ represents the maximum driver steering torque as a predetermined value, $A_y$ represents the vehicle lateral acceleration, $K_0$ represents the initial slope, and $T_d$ represents the driver steering torque.

The initial slope $K_0$ may be defined as a tangential slope at an initial starting point representing a predetermined vehicle lateral acceleration minimum point in the diagram as illustrated in FIG. 3, and the driver steering torque $T_d$ may be obtained as the driver steering torque required to obtain the corresponding vehicle lateral acceleration under the situation where the steering assist is made.

The maximum driver steering torque $T_{max}$ sets the maximum value of the steering torque that the driver applies to the steering wheel upon the steering wheel operation of the driver. According to embodiments of the present disclosure, the maximum driver steering torque is also set as a predetermined value along with the initial slope.

Further, when the driver steering torque $T_{col}$ linearly proportional to the lateral acceleration $A_y$ is defined as a total torque, the ratio of the driver steering torque upon the steering assist to the total torque $T_{col}$ is defined as a torque ratio $R_a$. Here, the driver steering torque $T_{col}$ linearly proportional to the lateral acceleration $A_y$ is the driver steering torque indicated by the dotted line in FIG. 3, and means the steering torque that the driver needs to input through the steering wheel in order to obtain the vehicle lateral acceleration $A_y$ corresponding to the case in which the steering assist is not made.

Here, the torque ratio $R_a$ is set as a value of 0 to 1. For example, if the driver steering torque $T_d$ upon the steering assist is 70% of the total torque (i.e., steering torque when there is no steering assist) $T_{col}$, the torque ratio $R_a$ is 0.7 ($R_a=0.7$).

As a result, the steering torque $T_d$ and the assist torque $T_A$ upon the steering assist using the torque ratio may be represented by the following Equations (2) and (3).

$$T_d = R_a \cdot T_{col} \qquad \text{Equation (2)}$$

$$T_A = (1-R_a) \cdot T_{col} \qquad \text{Equation (3)}$$

Here, $T_{col}$ represents the driver steering torque for obtaining the vehicle lateral acceleration $A_y$ without the steering assist, that is, the driver steering torque linearly proportional to the vehicle lateral acceleration $A_y$ in FIG. 3 (indicated by the dotted line in FIG. 3) and $T_A$ represents the assist torque that the motor needs to assist.

In addition, the driver steering torque for obtaining the vehicle lateral acceleration $A_y$ without the steering assist, that is, the driver steering torque $T_{col}$ linearly proportional to the vehicle lateral acceleration becomes a sum of the driver steering torque value and the assist torque value upon the steering assist, that is, the driver steering torque $T_{col}$ linearly proportional to the vehicle lateral acceleration may be presented by the following Equation (4).

$$T_{col} = \frac{b \cdot m \cdot r \cdot Rp}{(a+b)Earm} A_y \quad \text{Equation (4)}$$

In the above Equation (4), a, m, r, Rp, and Earm are the vehicle eigen value information, a represents a distance from a center of gravity of the vehicle to a front wheel shaft and b represents a distance from a center of gravity of the vehicle to a rear wheel shaft. In addition, m represents a vehicle mass, r represents a sum of a caster trail of a front wheel and a tire pneumatic trail of a front wheel, Earm represents an effective steering moment arm length, Rp represents a radius of the steering pinion gear.

As a result, the following Equation (5) for calculating the assist torque may be obtained by arranging Equations (1) to (4).

$$T_A = \frac{T_{col}^2 + \frac{T_{max}}{K_0 \cdot C}(1 - K_0 \cdot C) \cdot T_{col}}{T_{col} + \frac{T_{max}}{K_0 \cdot C}} \quad \text{Equation (5)}$$

In the above Equation (5), the constant C is defined by the following Equation (6).

$$C = \frac{b \cdot m \cdot r \cdot Rp}{(a+b)Earm} \quad \text{Equation (6)}$$

In the above Equation (6), C is obtained by the known values that are the vehicle eigen value information and therefore may be a constant, and $T_{col}$ is a value of '$C \times A_y$' in Equation (4). Accordingly, if Equation (1) is used, the above Equation (4) may be transformed into the equation including the $T_d$ which is the driver steering torque instead of the later acceleration $A_y$.

Therefore, arranging the above Equation (5) after instead of the $T_{col}$, the equation including the $T_d$ which is the driver steering torque is substituted into the equation, the above Equation (5) may be transformed into the equation including the driver steering torque $T_d$, the maximum driver steering torque $T_{max}$ and the initial slope $K_0$, which are the set information, and the C that may be calculated from the vehicle eigen value information. That is, the relational equation representing the relationship between the assist torque $T_A$ and the driver steering torque $T_d$ may be obtained. In the relational equation, the input variable becomes the driver steering torque $T_d$.

In addition, the relational equation uses the driver steering torque $T_d$, which is an input variable, as a variable, and the maximum driver steering torque $T_{max}$, the initial slope $K_0$, and the C included in the relational equation are known constant values. Among those, the C is a constant determined according to the vehicle eigen value information, and therefore only the maximum driver steering torque $T_{max}$ and the initial slope $K_0$ are enough to be set by the preceding test and evaluation process.

As described above, according to embodiments the present disclosure, upon setting the assist torque $T_A$ as the value depending on the driver steering torque $T_d$, after only the maximum driver steering torque $T_{max}$ and the initial slope $K_0$ are tuned and set as appropriate values, if the C value calculated from the value set by tuning the maximum driver steering torque $T_{max}$ and the initial slope $K_0$ and the vehicle eigen value information is used, the assist torque value $T_A$ depending on the driver steering torque $T_d$ may be defined as the example of FIG. 5.

As a result, by using the above equations, the assist torque value $T_A$ depending on the driver steering torque $T_d$ may be calculated, and the torque map defining the correlation (referring to the diagram of FIG. 5) between the driver steering torque $T_d$ and the assist torque $T_A$ may be produced. The torque map may be used so that the ECU determines the assist torque $T_A$ from the driver steering torque $T_d$ in the actual MDPS logic.

Further, instead of the torque map, the ECU can calculate the assist torque $T_A$ based on the driver steering torque $T_d$ detected by the torque sensor in real-time by using the equation including the driver steering torque as the variable while including the maximum driver steering torque T and the initial slope $K_0$, which are the set values, and the constant value C determined from the vehicle eigen value information upon the execution of the MDPS logic.

The equations described above are equations that are configured to use the maximum driver steering torque $T_{max}$ and the initial slope $K_0$, which are the set information, and the C obtained from the vehicle eigen value information and can calculate the assist torque $T_A$ to which the vehicle lateral acceleration $A_y$ is reflected depending on the driver steering torque $T_d$. Even when the torque map is used, the map value set depending on the driver steering torque $T_d$, that is, the assist torque $T_A$ value set as the value depending on the driver steering torque $T_d$ is a value to which the vehicle lateral acceleration $A_y$ is reflected.

In particular, in the present disclosure, the assist torque $T_A$ reflects the relationship between the driver steering torque ($T_{col}$ in FIG. 3) and the reaction (lateral acceleration $A_y$) of the vehicle that satisfies the conditions indicating the good feedback sense. In this way, if the assist torque is determined using the above equations or the torque map, it is possible to improve the coincidence sense between the steering operation of the driver and the vehicle response and the feedback sense upon the steering operation.

Of course, in the MDPS system, if the driver steering torque $T_d$ is detected by the torque sensor, the ECU determines the assist torque $T_A$ corresponding to the detected driver steering torque $T_d$ using the torque map or equations that are described above, and then controls the driving of the motor based on the determined assist torque $T_A$ to perform the steering assist.

By applying the method for determining an assist of a power steering system according to embodiments of the present disclosure, it is possible to improve the coincidence between the steering operation of the driver and the vehicle reaction as well as the feedback sense upon the steering operation by tuning the best assist torque value according to the driver steering torque based on the conditions under which the best feedback sense can be provided and the equation considering the relationship between the driver steering torque and the vehicle reaction under the conditions.

Hereinabove, although certain embodiments of the present disclosure are described above in detail, the protection scope of the present disclosure is not limited thereto. Therefore, various changes and improved forms by those skilled in the art using basic concepts of the present disclosure defined in the following claims belongs to the protection scope of the present disclosure.

What is claimed is:

1. A method for determining an assist torque of a power steering system in a vehicle, the method comprising:
    setting, by an electronic control unit (ECU), an initial slope indicating a correlation between a driver steering torque and a vehicle lateral acceleration, wherein the initial slope is a tangential slope at a lowest point of the vehicle lateral acceleration defined in a diagram;
    setting, by the electronic control unit (ECU), a maximum driver steering torque, which is a maximum value of a steering torque that a driver applies through a steering wheel of the vehicle;
    calculating, by the electronic control unit (ECU), an assist torque based on the driver steering torque in response to performance of a steering assist, from the set initial slope and maximum driver steering torque, and vehicle eigen value information based on a predetermined equation;
    generating, by the electronic control unit (ECU), a torque map in which an assist torque value is set based on the driver assist torque upon the performance of the steering assist using assist torque values obtained for each driver steering torque detected by a torque sensor;
    determining, by the electronic control unit (ECU), the assist torque value corresponding to the driver steering torque using the generated torque map; and
    controlling, by the electronic control unit (ECU), driving of a motor based on the determined assist torque value so as to perform the steering assist.

2. The method of claim 1, wherein the initial slope and the maximum driver steering torque have a relationship defined according to the following Equation (1):

$$\frac{1}{T_{max}} \cdot A_y + \frac{1}{K_0} = \frac{A_y}{T_d},$$

wherein $T_{max}$ represents the maximum driver steering torque, $A_y$ represents the vehicle lateral acceleration, $K_0$ represents the initial slope, and $T_d$ represents the driver steering torque upon performance of the steering assist.

3. The method of claim 2, wherein the predetermined equation for calculating the assist torque based on the driver steering torque upon performance of the steering assist depends on the following Equation (5):

$$T_A = \frac{T_{col}^2 + \frac{T_{max}}{K_0 \cdot C}(1 - K_0 \cdot C) \cdot T_{col}}{T_{col} + \frac{T_{max}}{K_0 \cdot C}},$$

wherein $T_A$ represents the assist torque, C represents a constant obtained from the vehicle eigen value information, and $T_{col}$ represents a sum ($T_d+T_A$) of the driver steering torque value and the assist torque value upon performance of the steering assist as a driver steering torque ($C \times A_y$) linearly proportional to the vehicle lateral acceleration.

4. The method of claim 3, wherein the vehicle eigen value information includes a distance from a center of gravity of the vehicle to a front wheel shaft, a distance from the center of gravity of the vehicle to a rear wheel shaft, a vehicle mass, a caster trail of the front wheel, a tire pneumatic trail of the front wheel, an effective steering moment arm length, and a radius of a steering pinion gear of the vehicle.

5. The method of claim 4, wherein the constant C is a obtained from the vehicle eigen value information according to the following Equation (6):

$$C = \frac{b \cdot m \cdot r \cdot Rp}{(a+b)Earm},$$

wherein a represents the distance from the center of gravity of the vehicle to the front wheel shaft, b represents the distance from the center of gravity of the vehicle to the rear wheel shaft, m represents the vehicle mass, r represents a sum of the caster trail of the front wheel and the tire pneumatic trail of the front wheel, Earm represents the effective steering moment arm length, and Rp represents the radius of the steering pinion gear.

6. The method of claim 1, wherein the vehicle eigen value information includes a distance from a center of gravity of the vehicle to a front wheel shaft, a distance from a center of gravity of the vehicle to a rear wheel shaft, a vehicle mass, a caster trail of the front wheel, a tire pneumatic trail of the front wheel, an effective steering moment arm length, and a radius of a steering pinion gear of the vehicle.

* * * * *